United States Patent
Sun et al.

(10) Patent No.: US 11,776,381 B1
(45) Date of Patent: Oct. 3, 2023

(54) DOOR STATUS DETECTING METHOD AND DOOR STATUS DETECTING DEVICE

(71) Applicant: IRONYUN INC., Zhubei (TW)

(72) Inventors: Paul Kuei-Ker Sun, Zhubei (TW); Chia-Ming Chang, Zhubei (TW)

(73) Assignee: IRONYUN INC., Zhubei (TW)

( * ) Notice: Subject to any disclaimer, the term of this patent is extended or adjusted under 35 U.S.C. 154(b) by 0 days.

(21) Appl. No.: 17/835,101

(22) Filed: Jun. 8, 2022

(51) Int. Cl.
  *G08B 21/18* (2006.01)
  *G06K 7/14* (2006.01)

(52) U.S. Cl.
  CPC ......... *G08B 21/182* (2013.01); *G06K 7/1417* (2013.01)

(58) Field of Classification Search
  CPC ............................ G08B 21/182; G06K 7/1417
  See application file for complete search history.

(56) References Cited

U.S. PATENT DOCUMENTS

| | | | |
|---|---|---|---|
| 2018/0111271 A1 | 4/2018 | Hwang et al. | |
| 2022/0051513 A1* | 2/2022 | Schmidt | G07F 17/12 |
| 2022/0051514 A1* | 2/2022 | Schmidt | G07C 9/00309 |
| 2022/0070361 A1* | 3/2022 | Möttönen | H04N 7/188 |
| 2022/0341220 A1* | 10/2022 | Saito | G07C 9/00896 |
| 2022/0406112 A1* | 12/2022 | Calleberg | G07C 9/23 |
| 2023/0076910 A1* | 3/2023 | Kubota | G07C 9/37 |
| 2023/0128568 A1* | 4/2023 | Kubota | G06T 7/00 |
| | | | 713/186 |

FOREIGN PATENT DOCUMENTS

CN          112580432 A          3/2021

* cited by examiner

*Primary Examiner* — Ojiako K Nwugo

(57) ABSTRACT

A door status detecting method by using at least one QR code is executed by a door status detecting device including a camera unit and a processing unit. The camera unit is utilized to monitor a door having at least one QR code. The processing unit receives at least one monitoring frame of a monitoring video from the camera unit, and the processing unit further determines whether the door status of the door is at a closed status according to a position of the at least one QR code in the at least one monitoring frame. Since the processing unit utilizes the position of the at least one QR code to determine the door status, the processing unit does not need to include an Artificial intelligence (AI) model to detect the abnormal conditions. Therefore computation loads of the process unit can be reduced.

18 Claims, 10 Drawing Sheets

DOOR STATUS DETECTING METHOD AND DOOR STATUS DETECTING DEVICE

BACKGROUND OF THE INVENTION

1. Field of the Invention

The present invention relates to a door status detecting method and a door status detecting device, especially a door status detecting method and a door status detecting device to detect a door status by using at least one QR code.

2. Description of the Related Art

A surveillance camera is used to monitor a surveillance scene. Further, the surveillance camera usually includes an image recognition function to detect abnormal conditions in the surveillance scene, such as an intrusion detection, a legacy detection, etc.

Therefore, the image recognition function can save manpower from staring at real-time images recorded by the surveillance camera, and can reduce personnel's work load from focusing on the real-time images.

The image recognition function usually needs an Artificial intelligence (AI) model to detect the abnormal conditions in the surveillance scene. However, the AI model increases computation loads of an electronic device having image recognition function. Therefore, the electronic device having image recognition function by using AI model needs to be improved.

SUMMARY OF THE INVENTION

In view of the above-mentioned needs, the main purpose of the present invention is to provide a door status detecting method and a door status detecting device to detect a door status by using at least one QR code. The door status detecting device includes a camera unit, a processing unit, and a warning unit. The processing unit is electrically connected to the camera unit and the warning unit. The camera unit is utilized to monitor a door having at least one QR code.

The processing unit executes the door status detecting method to receive at least one monitoring frame of a monitoring video from the camera unit, and to determine whether the at least one QR code is read from the at least one monitoring frame.

When the at least one QR code is read from the at least one monitoring frame, the processing unit further determines whether the door status of the door is at a closed status according to a position of the at least one QR code in the at least one monitoring frame.

If yes, the processing unit determines that the door status is at the closed status.

If not, the processing unit determines that the door status is at an opened status.

Since the processing unit utilizes the position of the at least one QR code in the at least one monitoring frame to determine the door status, the processing unit does not need to include an Artificial intelligence (AI) model to detect the abnormal conditions. Therefore, computation loads of the processing unit can be reduced.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1:
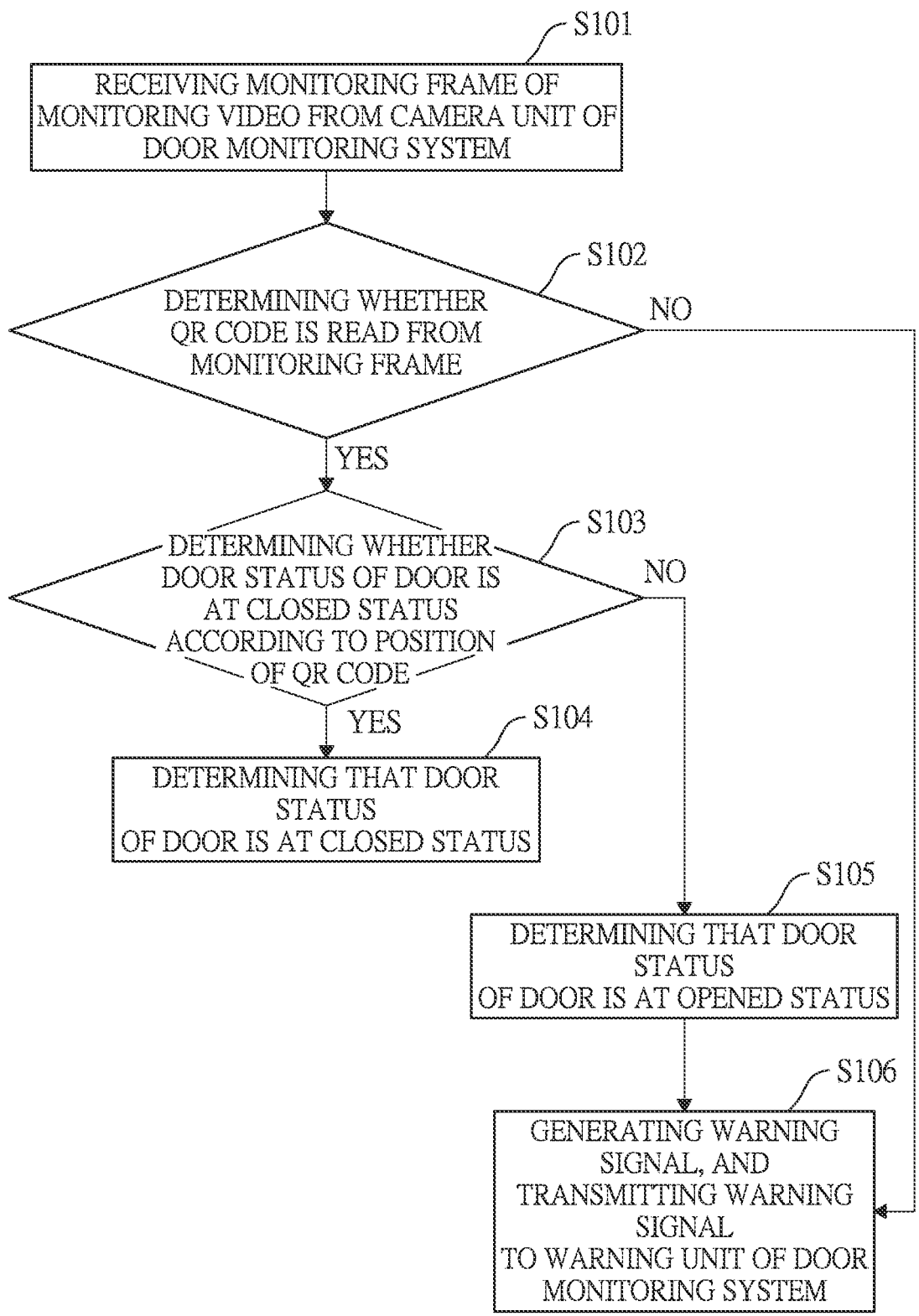
FIG. 1 is a flowchart of one embodiment of a door status detecting method of the present invention.
Figure 2:
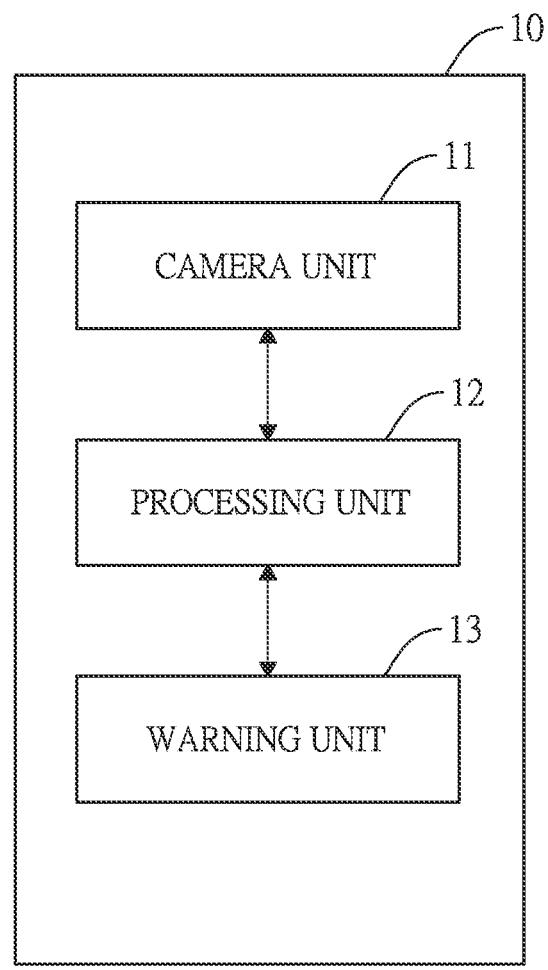
FIG. 2 is a block diagram of a door status detecting device of the present invention.

FIG. 1 is a flowchart of a door status detecting method by using at least one QR code, which is executed by a processing unit 12 of a door status detecting device 10. Further with reference to FIG. 2, FIG. 2 is a block diagram of the door status detecting device 10. The door status detecting device 10 includes a camera unit 11, the processing unit 12, and a warning unit 13. The processing unit 12 is electrically connected to the camera unit 11 and the warning unit 13. In one embodiment, the door status detecting device 10 may be a monitor, a video recorder, a closed circuit television (CCTV) camera, a surveillance camera, a security camera, etc.

The camera unit 11 monitors a door having at least one QR code. In steps S101 to S102, the processing unit 12 receives at least one monitoring frame from the camera unit 11, and determines whether the at least one QR code is read from the at least one monitoring frame.

In step S103, when the at least one QR code is read from the at least one monitoring frame, the processing unit 12 further determines whether a door status of the door is at a closed status according to a position of the at least one QR code in the at least one monitoring frame.

In step S104, if yes, the processing unit 12 determines that the door status is at the closed status.

In step S105, if not, the processing unit 12 determines that the door status is at an opened status.

In step S106, when the door status of the door is at the opened status, or when the at least one QR code is unread from the at least one monitoring frame, the processing unit 12 further generates a warning signal, and transmits the warning signal to the warning unit 13 for alarming the warning unit 13.

In the embodiment, the warning unit 13 may be a display for displaying a warning image, a speaker for alarming a warning audio, etc. Moreover, the processing unit 12 reading the at least one QR code from the at least one monitoring frame means that the processing unit 12 can recognize the at least one QR code in the at least one monitoring frame.

Since the processing unit 12 can utilize the position of the at least one QR code in the at least one monitoring frame, the processing unit 12 does not need to include an Artificial intelligence (AI) model to detect the abnormal conditions for reducing computation loads of the processing unit 12.

Figure 3:
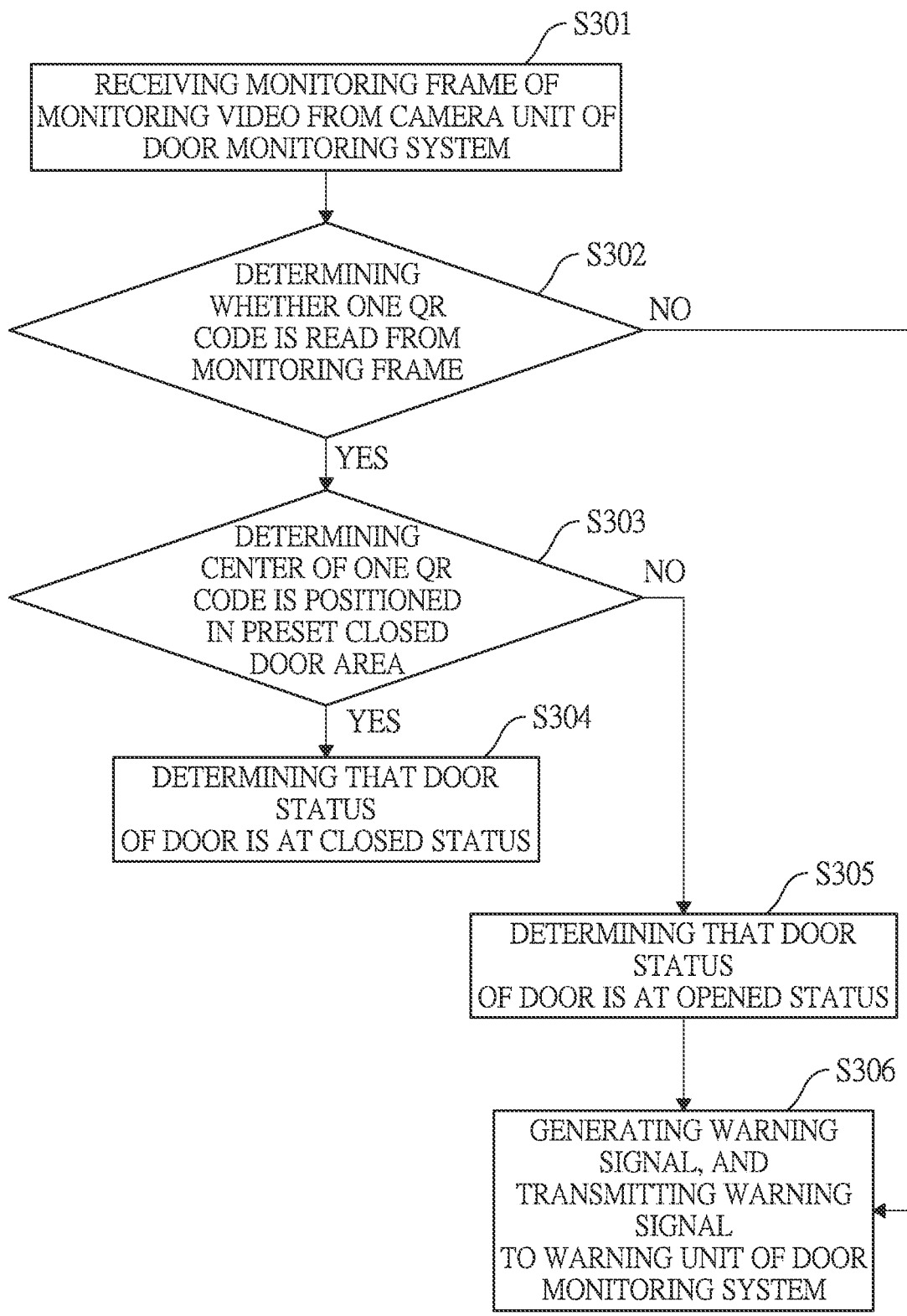
FIG. 3 is a flowchart of another embodiment of a door status detecting method of the present invention.

Further, with reference to FIG. 3, another embodiment of the door status detecting method is shown.

In step S301, the processing unit 12 receives at least one monitoring frame from the camera unit 11.

In step S302, when the processing unit 12 determines whether the at least one QR code is read from the at least one monitoring frame, the processing unit 12 is determining whether one QR code is read from the at least one monitoring frame.

In step S303, when the one QR code is read from the at least one monitoring frame, the processing unit 12 further determines a center of the one QR code is positioned at a preset closed door area.

In step S304, when the center of the one QR code is positioned at the preset closed door area, the processing unit 12 determines that the door status of the door is at the closed status.

In step S305, when the center of the one QR code is positioned outside the preset closed door area, the processing unit 12 determines that the door status of the door is at the opened status.

In step S306, when the processing unit 12 determines that the door status of the door is at the opened status, the processing unit 12 further generates the warning signal and transmits the warning signal to the warning unit 13 for warning personnel who needs to monitor a surveillance scene, such as the door 20.

Figure 4A:
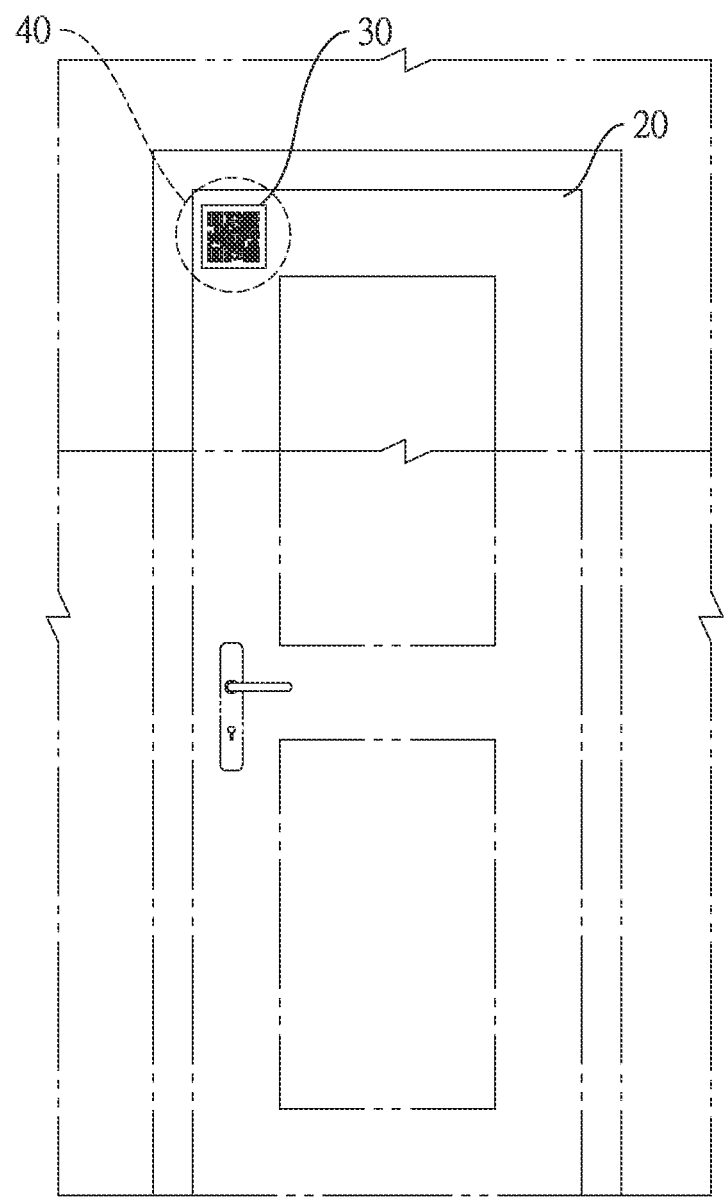
FIGS. 4A and 4B are schematic diagrams of monitoring frames of a monitoring video received from a camera unit of the door status detecting device.
Figure 4B:
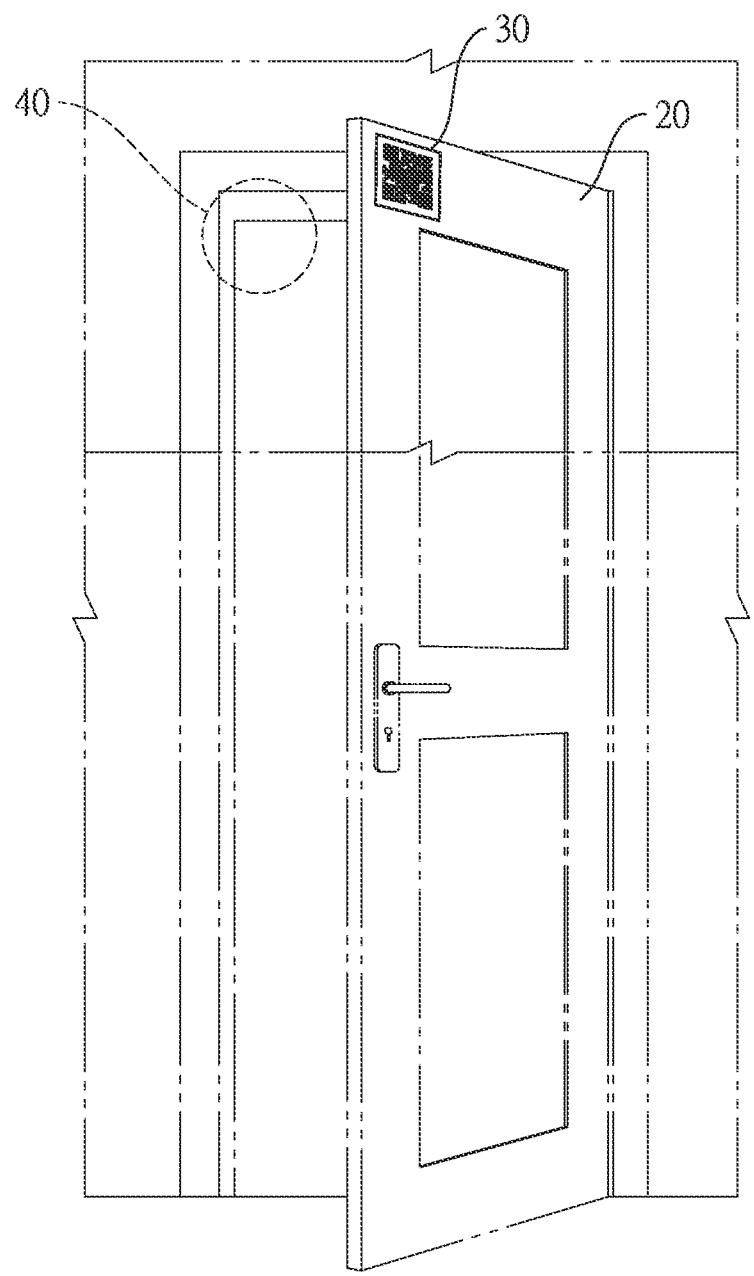

For example, with reference to FIGS. 4A and 4B, the camera unit 11 monitors the door 20 having one QR code 30 for recording the monitoring video. Upper areas in FIGS. 4A and 4B using solid lines are monitored by the camera unit 11. The preset closed door area 40 is a circle, and a radius of the circle is a first threshold.

Since the one QR code 30 is mounted on the door 20, the one QR code 30 on the door 20 can be captured by the camera unit 11. As shown in FIG. 4A, when the door 20 is at the closed status, the center of the one QR code 30 is positioned in the preset closed door area 40. As shown in FIG. 4B, when the door 20 is at the open status, the center of the one QR code 30 is not positioned in the preset closed door area 40. Namely, when the processing unit 12 determines that the center of the one QR code 30 is positioned in the preset closed door area 40, the door 20 is at the closed status, otherwise, the door 20 is at the opened status.

Moreover, if the one QR code 30 drops from the door 20, or if the camera unit 11 monitors a wrong surveillance scene, the processing unit 12 cannot read the one QR code 30 from the frame. Therefore, the processing unit 12 may also generate the warning signal for warning the personnel who needs to monitor the surveillance scene.

Figure 5:
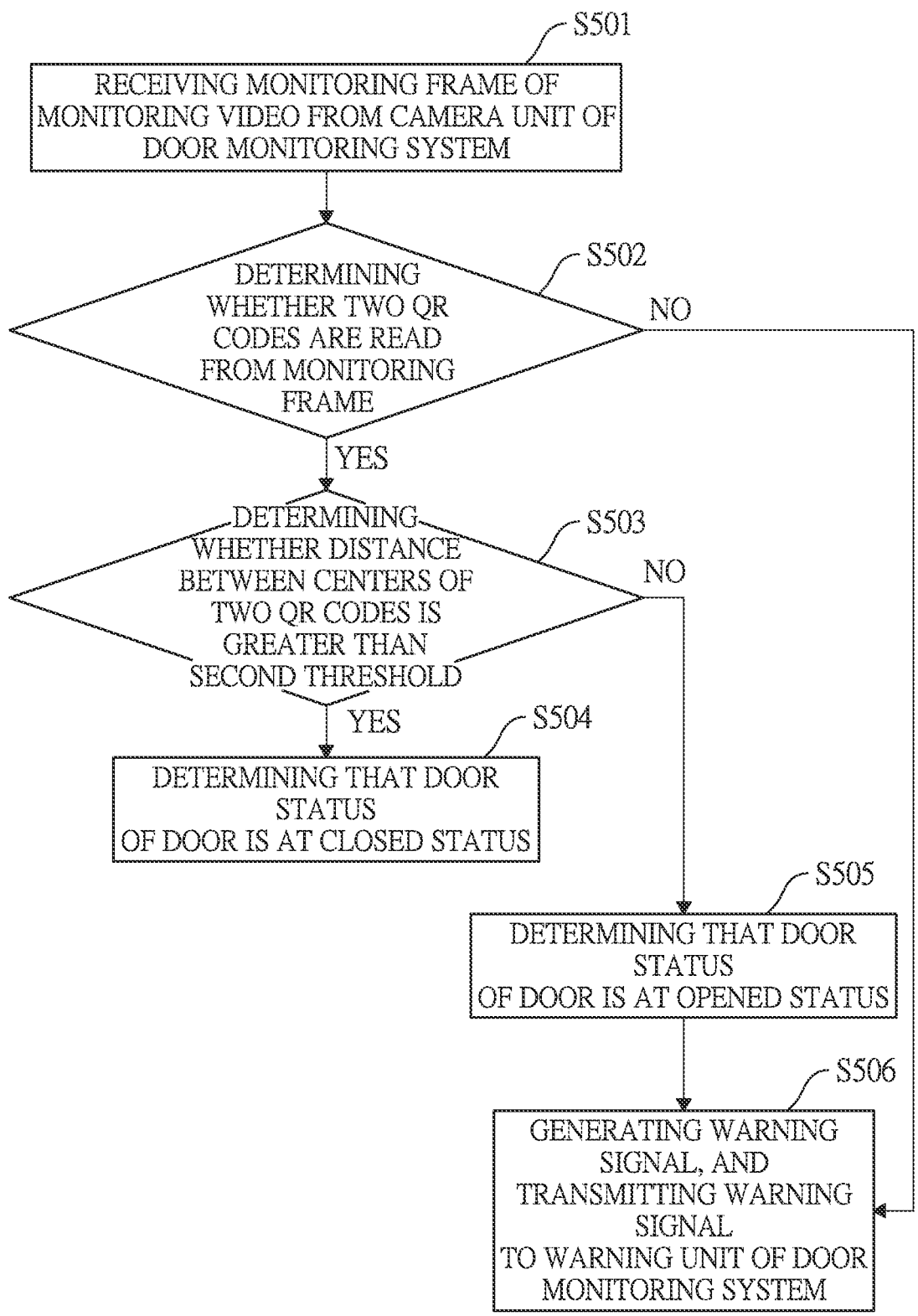
FIG. 5 is a flowchart of still another door status detecting method of the present invention.

Moreover, with reference to FIG. 5, still another embodiment of the door status detecting method is shown.

In step S501, the processing unit 12 receives at least one monitoring frame from the camera unit 11.

In step S502, when the processing unit 12 determines whether the at least one QR code 30 is read from the at least one monitoring frame, the processing unit 12 is determining whether two QR codes are read from the at least one monitoring frame.

In step S503, when the two QR codes are read from the at least one monitoring frame, the processing unit 12 further determines whether a distance between centers of the two QR codes is greater than a second threshold.

In step S504, when the distance between the centers of the two QR codes is greater than the second threshold, the processing unit 12 determines that the door status of the door 20 is at the closed status.

In step S505, when the distance between the centers of the two QR codes is smaller than or equal to the second threshold, the processing unit 12 determines that the door status of the door 20 is at the opened status.

In step S506, when the processing unit 12 determines that the door status of the door 20 is at the opened status, the processing unit 12 further generates the warning signal and transmits the warning signal to the warning unit 13 for warning personnel who needs to monitor a surveillance scene, such as the door 20.

Figure 6A:
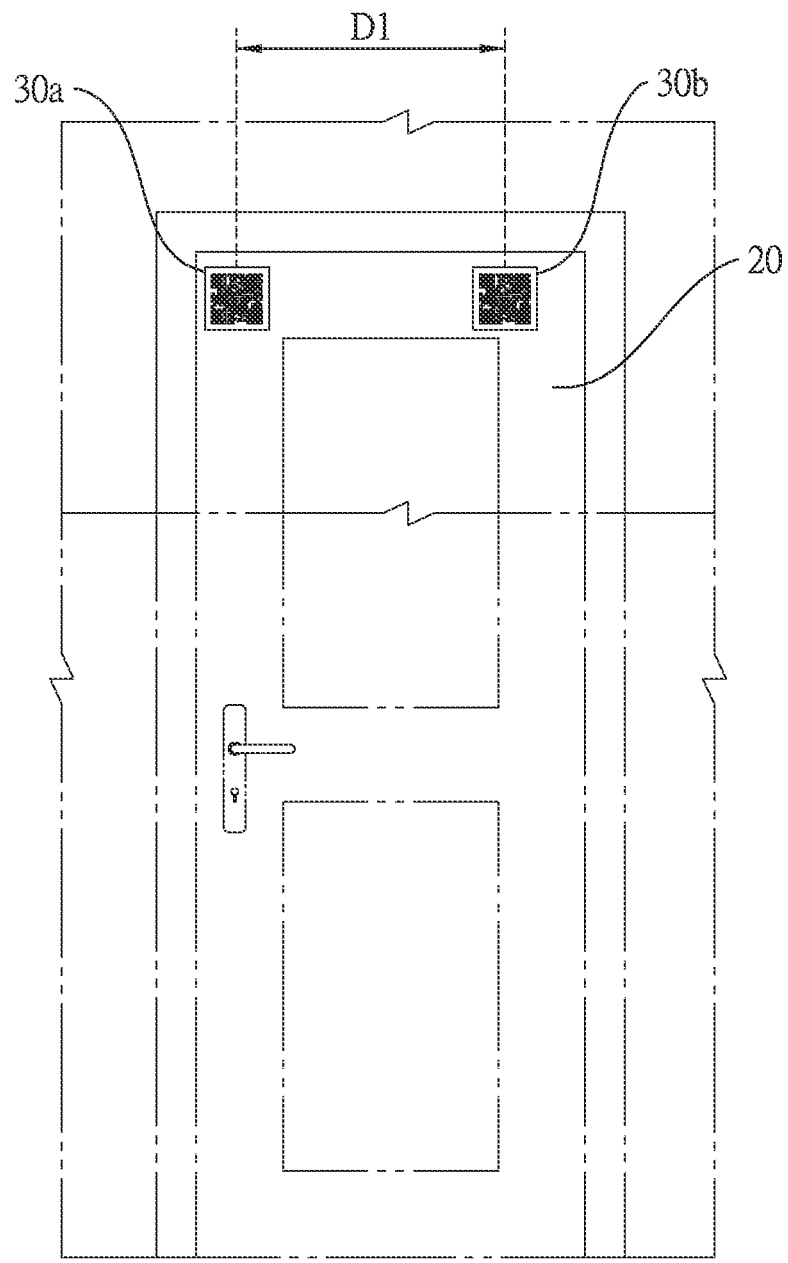
FIGS. 6A and 6B are schematic diagrams of monitoring frames of a monitoring video received from a camera unit of the door status detecting device.
Figure 6B:
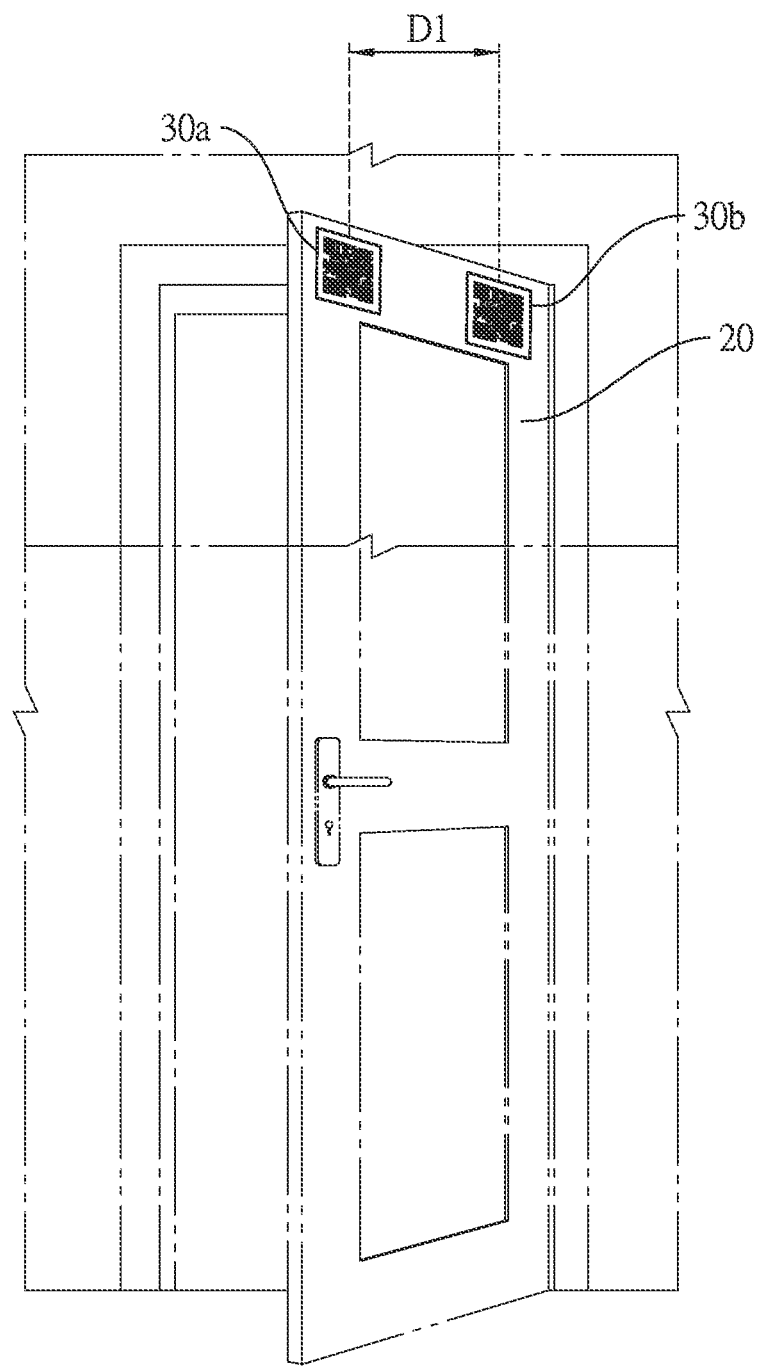

For example, with reference to FIGS. 6A and 6B, the camera unit 11 monitors the door 20 having two QR codes 30a, 30b for recording the monitoring video. Upper areas in FIGS. 6A and 6B using solid lines are monitored by the camera unit 11. Since the two QR codes 30a, 30b are mounted on the door 20, the two QR codes 30a, 30b on the door 20 can be captured by the camera unit 11. As shown in FIG. 6A, when the door 20 is at the closed status, the distance D1 between the centers of the two QR codes 30a, 30b is greater than the second threshold. As shown in FIG. 6B, when the door 20 is at the open status, the distance D1 between the centers of the two QR codes 30a, 30b is smaller than or equal to the second threshold. Namely, when the processing unit 12 determines that the distance D1 is greater than the second threshold, the door 20 is at the closed status; otherwise, the door 20 is at the opened status. In the embodiment, the distance D1 is a horizontal distance between the centers of the two QR codes 30a, 30b.

Figure 7A:
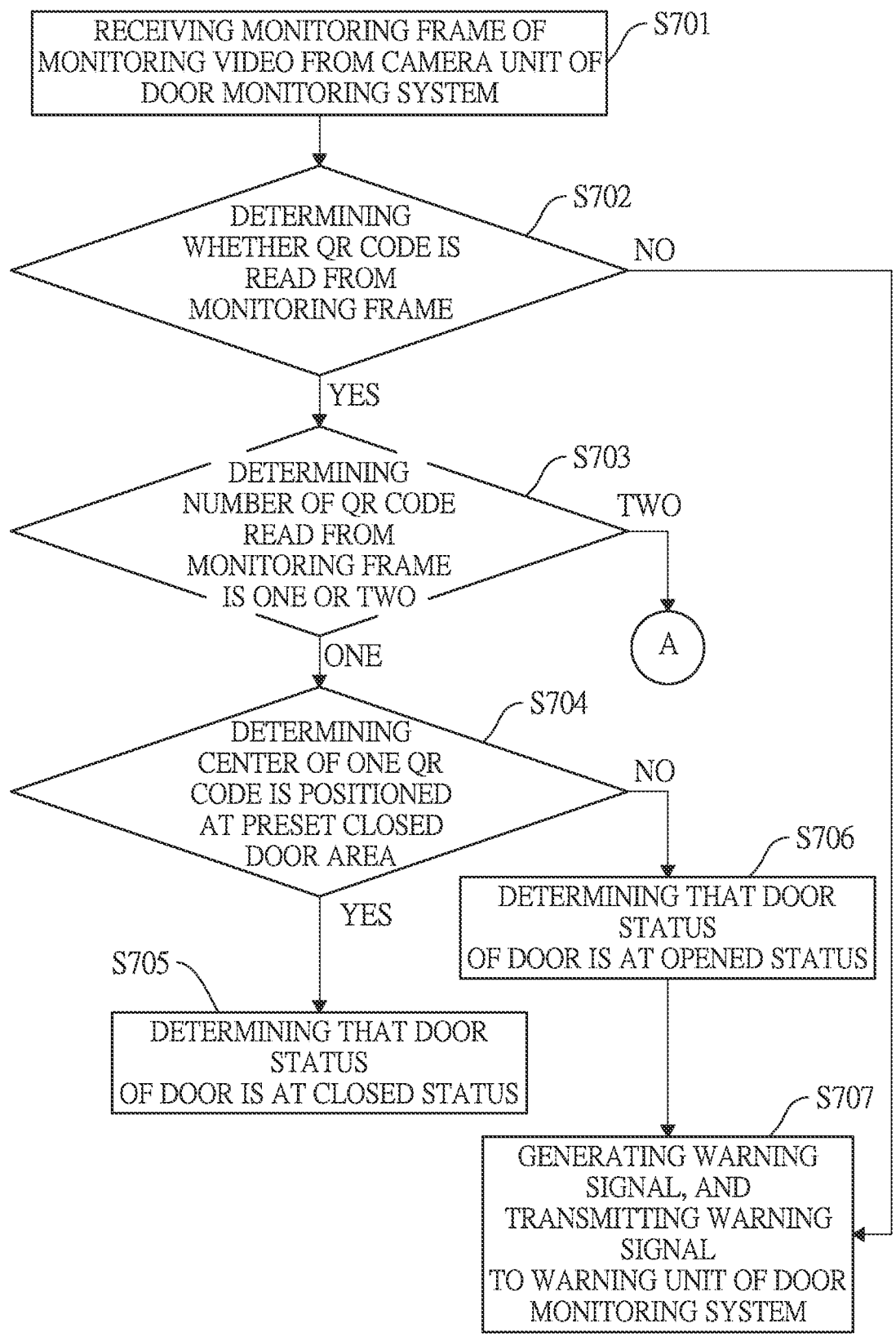
FIGS. 7A and 7B are flowcharts of another embodiment of a door status detecting method of the present invention.
Figure 7B:
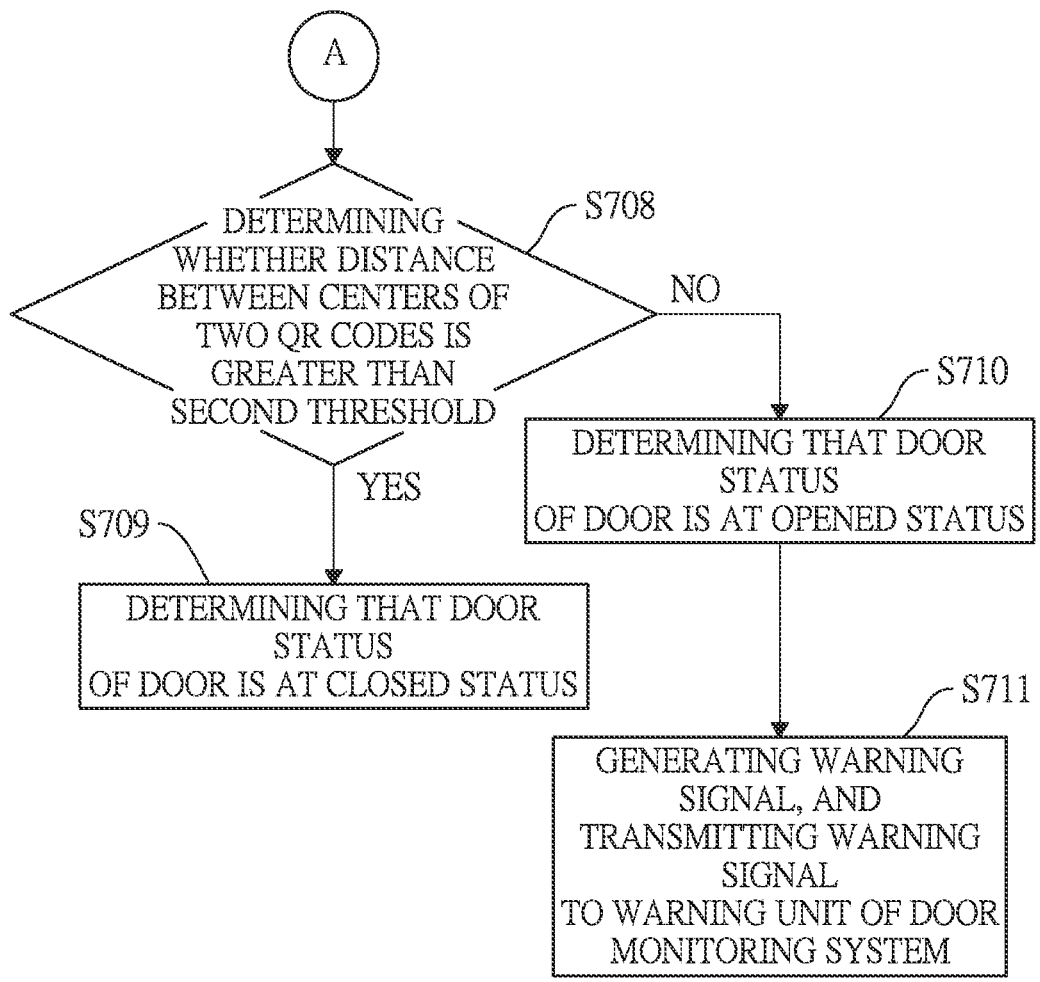

Furthermore, with reference to FIGS. 7A and 7B, another embodiment of the door status detecting method is shown.

In steps S701 and S702, the processing unit 12 receives at least one monitoring frame from the camera unit 11, and determines whether the at least one QR code 30 is read from the at least one monitoring frame.

In step S703, when the processing unit 12 determines whether the door status of the door 20 is at the closed status, the processing unit 12 firstly determines a number of the at least one QR code 30 read from the at least one monitoring frame is one or two.

In step S704, when the number of the at least one QR code 30 read from the at least one monitoring frame is one, the processing unit 12 further determines the center of the one QR code 30 is positioned at the preset closed door area 40.

In step S705, when the center of the one QR code 30 is positioned at the preset closed door area 40, the processing unit 12 determines that the door status of the door 20 is at the closed status.

In steps S706 and S707, when the center of the one QR code 30 is positioned outside the preset closed door area 40, the processing unit 12 determines that the door status of the door 20 is at the opened status, and the processing unit 12 further generates the warning signal and transmits the warning signal to the warning unit 13.

In step S708, when the number of the at least one QR code 30a, 30b read from the at least one monitoring frame is two, the processing unit 12 further determines whether the distance D1 between centers of the two QR codes 30a, 30b is greater than the second threshold.

In step S709, when the distance D1 between the centers of the two QR codes 30a, 30b is greater than the second threshold, the processing unit 12 determines that the door status of the door 20 is at the closed status.

In steps S710 and S711, when the distance D1 between the centers of the two QR codes 30*a*, 30*b* is smaller than or equal to the second threshold, the processing unit 12 determines that the door status of the door 20 is at the opened status, and the processing unit 12 further generates the warning signal and transmits the warning signal to the warning unit 13.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A door status detecting method, executed by a processing unit of a door status detecting device, and comprising steps of:
   receiving at least one monitoring frame of a monitoring video from a camera unit of the door status detecting device; wherein the camera unit monitors a door having at least one QR code;
   determining whether the at least one QR code is read from the at least one monitoring frame;
   when the at least one QR code is read from the at least one monitoring frame, determining whether a door status of the door is at a closed status according to only a position of the at least one QR code in the at least one monitoring frame, wherein data included in the at least one QR code is not relied upon in making a door status determination;
   if the at least one QR code is read from the at least one monitoring frame, determining that the door status is at the closed status; and
   if the at least one QR code is not read from the at least one monitoring frame, determining that the door status is at an opened status.

2. The door status detecting method as claimed in claim 1, when the door status of the door is at the opened status, further generating a warning signal, and transmitting the warning signal to a warning unit of the door status detecting device.

3. The door status detecting method as claimed in claim 1, when the at least one QR code is unread from the at least one monitoring frame, generating the warning signal, and transmitting the warning signal to a warning unit of the door status detecting device.

4. The door status detecting method as claimed in claim 1, when determining whether the at least one QR code is read from the at least one monitoring frame, determining whether one QR code is read from the at least one monitoring frame;
   wherein when the one QR code is read from the at least one monitoring frame, determining a center of the one QR code is positioned in a preset closed door area;
   wherein when the center of the one QR code is positioned in the preset closed door area, determining that the door status of the door is at the closed status;
   wherein when the center of the one QR code is positioned outside the preset closed door area, determining that the door status of the door is at the opened status.

5. The door status detecting method as claimed in claim 4, wherein the preset closed door area is a circle, and a radius of the circle is a first threshold.

6. The door status detecting method as claimed in claim 1, when determining whether the at least one QR code is read from the at least one monitoring frame, determining whether two QR codes are read from the at least one monitoring frame;
   wherein when the two QR codes are read from the at least one monitoring frame, determining whether a distance between centers of the two QR codes is greater than a second threshold;
   wherein when the distance between the centers of the two QR codes is greater than the second threshold, determining that the door status of the door is at the closed status;
   wherein when the distance between the centers of the two QR codes is smaller than or equal to the second threshold, determining that the door status of the door is at the opened status.

7. The door status detecting method as claimed in claim 1, wherein the step of determining whether the door status of the door is at the closed status further comprises sub steps of:
   determining a number of the at least one QR code read from the at least one monitoring frame is one or two;
   when the number of the at least one QR code read from the at least one monitoring frame is one, determining a center of the one QR code is positioned at a preset closed door area;
   when the center of the one QR code is positioned at the preset closed door area, determining that the door status of the door is at the closed status;
   when the center of the one QR code is positioned outside the preset closed door area, determining that the door status of the door is at the opened status.

8. The door status detecting method as claimed in claim 7, wherein the preset closed door area is a circle, and a radius of the circle is a first threshold.

9. The door status detecting method as claimed in claim 7, wherein when the number of the at least one QR code read from the at least one monitoring frame is two, determining whether a distance between centers of the two QR codes is greater than a second threshold;
   wherein when the distance between the centers of the two QR codes is greater than the second threshold, determining that the door status of the door is at the closed status;
   wherein when the distance between the centers of the two QR codes is smaller than or equal to the second threshold, determining that the door status of the door is at the opened status.

10. A door status detecting device, comprising:
    a camera unit, monitoring a door having at least one QR code;
    a processing unit, electrically connected to the camera unit;
    wherein the processing unit receives at least one monitoring frame of a monitoring video from the camera unit, and determines whether the at least one QR code is read from the at least one monitoring frame;
    wherein when the at least one QR code is read from the at least one monitoring frame, the processing unit determines whether a door status of the door is at a closed status according to only a position of the at least one QR code in the at least one monitoring frame, wherein data included in the at east one QR code is not relied upon in making a door status determination;

if the at least one QR code is read from the at least one monitoring frame, the processing unit determines that the door status is at the closed status;

if the at least one QR code is not read from the at least one monitoring frame, the processing unit determines that the door status is at an opened status.

11. The door status detecting device as claimed in claim 10, further comprising:

a warning unit, electrically connected to the processing unit;

wherein when the door status of the door is at the opened status, the processing unit further generates a warning signal, and transmits the warning signal to the warning unit.

12. The door status detecting device as claimed in claim 10, further comprising:

a warning unit, electrically connected to the processing unit;

wherein when the at least one QR code is unread from the at least one monitoring frame, the processing unit generates the warning signal, and transmits the warning signal to the warning unit.

13. The door status detecting device as claimed in claim 10, wherein when the processing unit determines whether the at least one QR code is read from the at least one monitoring frame, the processing unit is determining whether one QR code is read from the at least one monitoring frame;

wherein when the one QR code is read from the at least one monitoring frame, the processing unit further determines a center of the one QR code is positioned in a preset closed door area;

wherein when the center of the one QR code is positioned in the preset closed door area, the processing unit determines that the door status of the door is at the closed status;

wherein when the center of the one QR code is positioned outside the preset closed door area, the processing unit determines that the door status of the door is at the opened status.

14. The door status detecting device as claimed in claim 13, wherein the preset closed door area is a circle, and a radius of the circle is a first threshold.

15. The door status detecting device as claimed in claim 10, wherein when the processing unit determines whether the at least one QR code is read from the at least one monitoring frame, the processing unit is determining whether two QR codes are read from the at least one monitoring frame;

wherein when the two QR codes are read from the at least one monitoring frame, the processing unit further determines whether a distance between centers of the two QR codes is greater than a second threshold;

wherein when the distance between the centers of the two QR codes is greater than the second threshold, the processing unit determines that the door status of the door is at the closed status;

wherein when the distance between the centers of the two QR codes is smaller than or equal to the second threshold, the processing unit determines that the door status of the door is at the opened status.

16. The door status detecting device as claimed in claim 10, wherein when the processing unit determines whether the door status of the door is at the closed status, the processing unit firstly determines a number of the at least one QR code read from the at least one monitoring frame is one or two;

wherein when the number of the at least one QR code read from the at least one monitoring frame is one, the processing unit further determines a center of the one QR code is positioned at a preset closed door area;

wherein when the center of the one QR code is positioned at the preset closed door area, the processing unit determines that the door status of the door is at the closed status;

wherein when the center of the one QR code is positioned outside the preset closed door area, the processing unit determines that the door status of the door is at the opened status.

17. The door status detecting device as claimed in claim 16, wherein the preset closed door area is a circle, and a radius of the circle is a first threshold.

18. The door status detecting device as claimed in claim 16, wherein when the number of the at least one QR code read from the at least one monitoring frame is two, the processing unit further determines whether a distance between centers of the two QR codes is greater than a second threshold;

wherein when the distance between the centers of the two QR codes is greater than the second threshold, the processing unit determines that the door status of the door is at the closed status;

wherein when the distance between the centers of the two QR codes is smaller than or equal to the second threshold, the processing unit determines that the door status of the door is at the opened status.

* * * * *